United States Patent [19]

Kawasaki

[11] 3,869,697

[45] Mar. 4, 1975

[54] PATTERN IDENTIFYING SYSTEMS

[75] Inventor: Harumi Kawasaki, Tokyo, Japan

[73] Assignee: Asahi Kogaku Kogyo Kabushiki Kaisha, Tokyo, Japan

[22] Filed: Jan. 10, 1973

[21] Appl. No.: 322,553

[30] Foreign Application Priority Data

Jan. 13, 1972 Japan .................................. 47-5983

[52] U.S. Cl. .................. 340/146.3 P, 340/146.3 H, 350/162 SF, 356/71

[51] Int. Cl. ............................................. G06k 9/12

[58] Field of Search 340/146.3 F, 146.3 P, 146.3 Q, 340/146.3 H; 356/71; 350/3.5, 162 SF; 250/204

[56] References Cited

UNITED STATES PATENTS

| | | | |
|---|---|---|---|
| 3,064,519 | 11/1962 | Shelton | 340/146.3 P |
| 3,201,751 | 8/1965 | Rabinow | 340/146.3 H |
| 3,234,511 | 2/1966 | Brust et al. | 340/146.3 H |
| 3,314,052 | 4/1967 | Lohmann | 340/146.3 P |
| 3,457,422 | 7/1969 | Rottmann | 340/146.3 H |
| 3,613,082 | 10/1971 | Bouchard | 340/146.3 H |
| 3,648,039 | 3/1972 | Kowalski | 350/162 SF |
| 3,689,772 | 9/1972 | George et al. | 356/71 X |
| 3,729,634 | 4/1973 | Jensen et al. | 250/204 |

OTHER PUBLICATIONS

Croce et al., "Techniques for High-Data-Rate Two-Dimensional Optical Pattern Recognition," RCA Review, Vol. 32, Dec. 1971, pp. 610–634.

*Primary Examiner*—Gareth D. Shaw
*Assistant Examiner*—Leo H. Boudreau
*Attorney, Agent, or Firm*—Steinberg & Blake

[57] ABSTRACT

A system for identifying two-dimensional patterns. According to this system, a pattern which is to be identified is positioned at a reading location and a Fourier transformation image of the pattern is provided by an optical structure which is distributed along a predetermined optical axis. The Fourier transformation image is picked up by a photosensitive assembly which detects angular and radial components of the Fourier transformation image. These components are electrically converted into corresponding linear distributions which are then quantized. The detection of the angular and radical components of the Fourier transformation image takes place simultaneously throughout all parts of the image.

2 Claims, 10 Drawing Figures

Table - 1

| θ | 1 | 2 | 3 | 4 | 5 | 6 | 7 | 8 |
|---|---|---|---|---|---|---|---|---|
| a | 1 | 1 | 0 | 0 | 1 | 1 | 0 | 1 |
| b | 1 | 1 | 1 | 0 | 0 | 1 | 1 | 0 |
| c | 1 | 0 | 0 | 1 | 1 | 0 | 1 | 1 |
| | | | | | | | | |

Table - 2

| | θ | r | t |
|---|---|---|---|
| 0 | ⋮ | ⋮ | ⋮ |
| 1 | ⋮ | ⋮ | ⋮ |
| 2 | ⋮ | ⋮ | ⋮ |
| 3 | ⋮ | ⋮ | ⋮ |
| 4 | 10001010 | 1000 | 0 |
| ⋮ | ⋮ | ⋮ | ⋮ |

PATTERN IDENTIFYING SYSTEMS

BACKGROUND OF THE INVENTION

The present invention relates to pattern identifying systems.

In particular, the present invention relates to systems for identifying and recognizing two-dimensional patterns.

Thus, the present invention relates to that type of device which is known as an optical character reader (OCR). Readers of this latter type have been developed, for example, for automatically reading zip codes. Recent developments in this field have made it possible to recognize even handwritten letters of highly limited range. From a practical point of view, however, the patterns that can be treated include only such characters and symbols as are standardized in a special way for the OCR.

Thus, in this latter case what are recognized are the formed characters that can be read both by human beings and by machines. At the present time OCR'S are being developed that can handle printed or typewritten letters. However, due to the original concept of the OCR machine, in most of the latter the optical systems that are used merely function to illuminate or scan the input pattern. The logical operations for pattern recognition are carried out by a computer system. Therefore, when it is necessary to recognize relatively complex patterns, such as Chinese characters, an extremely large and expensive apparatus is required and the time required for carrying out the logic operations, which is to say the time required for pattern reading operations, is necessarily limited.

Since the advent of the laser, there have been researches in connection with light filtering techniques, and with such techniques there has been detection of correlative pattern images by means of matched filtering utilizing holography. In contrast, with an OCR based on time-series handling of pattern signals, these latter techniques have made it possible to carry out parallel or simultaneous handling of two-dimensional patterns. There is, therefore, a particular advantage in that the recognizing function of an OCR can be carried out optically rather than by way of a computer system. Moreover, there is a possibility of realizing a high-density compression of the pattern information, while there are the drawbacks of the OCR apparatus such as its high cost, large size, relatively low pattern reading speed, and limitation on the number of input characters which can be received. At the present time, however, pattern recognition by means of light filtering is still at the research stage. Characters which can be handled must be of a negative type, and thus, characters of a positive type such as printed letters cannot be handled unless an auxiliary structure is utilized. In addition, in order to discriminate between correlative images of letters which resemble each other closely it is necessary to apply special techniques such as a code conversion type of hologram. In connection with th optical systems, because of the use of holography, an extreme fineness is required with respect to alignment of the system when carrying out matched filter operations, and prevention of shaking is absolutely essential, with these latter requirements also being present when pattern identification is to be made, so that a practical optical system of this latter type is extremely complex and expensive. As a result of these latter factors apparatus capable of fluently reading patterns by means of light filtering, which is to say automatic high speed pattern recognizing apparatus, has not yet been practically realized.

SUMMARY OF THE INVENTION

It is accordingly a primary object of the present invention to provide a highly practical relatively inexpensive system for recognizing two-dimensional patterns at relatively high speed and with the possibility of a high degree of discrimination so that even characters which closely resemble each other can be readily recognized.

More particularly it is an object of the invention to reduce the cost of the electronic circuitry by providing an optical system which is capable of handling the two-dimensional information while reducing the logic-handling functions of the electronic circuitry.

In particular it is an object of the present invention to provide a system where alignment is readily carried out and the shake-resistant nature of the system is such that holography is not required.

Yet another object of the present invention is to provide a system of the above type which is capable of scanning a Fourier transformation image of a pattern in such a way that both angular and radial components of the image are simultaneously detected and converted into corresponding linear distributions.

It is also an object of the present invention to provide a system which has in addition to the latter information resulting from angular and radial scanning of a Fourier transformation image additional information with respect to a comparison of different parts of a character so as to discriminate between similar characters.

Thus, it is an object of the invention to provide a pattern-identifying system whose pattern discrimination ratio is greater than that of a coherent light correlation system.

In accordance with the invention the system for identifying two-dimensional patterns includes a positioning means for positioning a pattern which is to be identified at a reading location. An optical means is provided for forming a Fourier transformation image of a pattern at the reading location, this optical means having an optical axis extending through the reading location and having elements distributed along the optical axis before and behind the reading location. A photosensitive means is positioned with respect to the optical axis for receiving the Fourier transformation image and for detecting angular and radial components thereof. An electrical converting means is electrically connected with the photosensitive means for receiving an input therefrom formed by the angular and radial components and for converting these lattern components respectively into corresponding linear distributions which form an output of the electrical converting means. A quantizing means is electrically connected with the electrical converting means for receiving the output therefrom and for quantizing this output to achieve therefrom a signal which identifies the pattern at the reading location.

BRIEF DESCRIPTION OF DRAWINGS

The invention is illustrated by way of example in the accompanying drawings which form part of this application and in which:

FIG. 2 (*b*) illustrates Fourier transformation images of the characters of FIG. 2 (*a*);

FIG. 2 (*c*) illustrates scanning signals resulting from scanning of the images of FIG. 2 (*b*);

FIG. 3 (*b*) illustrates an optical fiber structure used in connection with radial detection;

Figure 1:
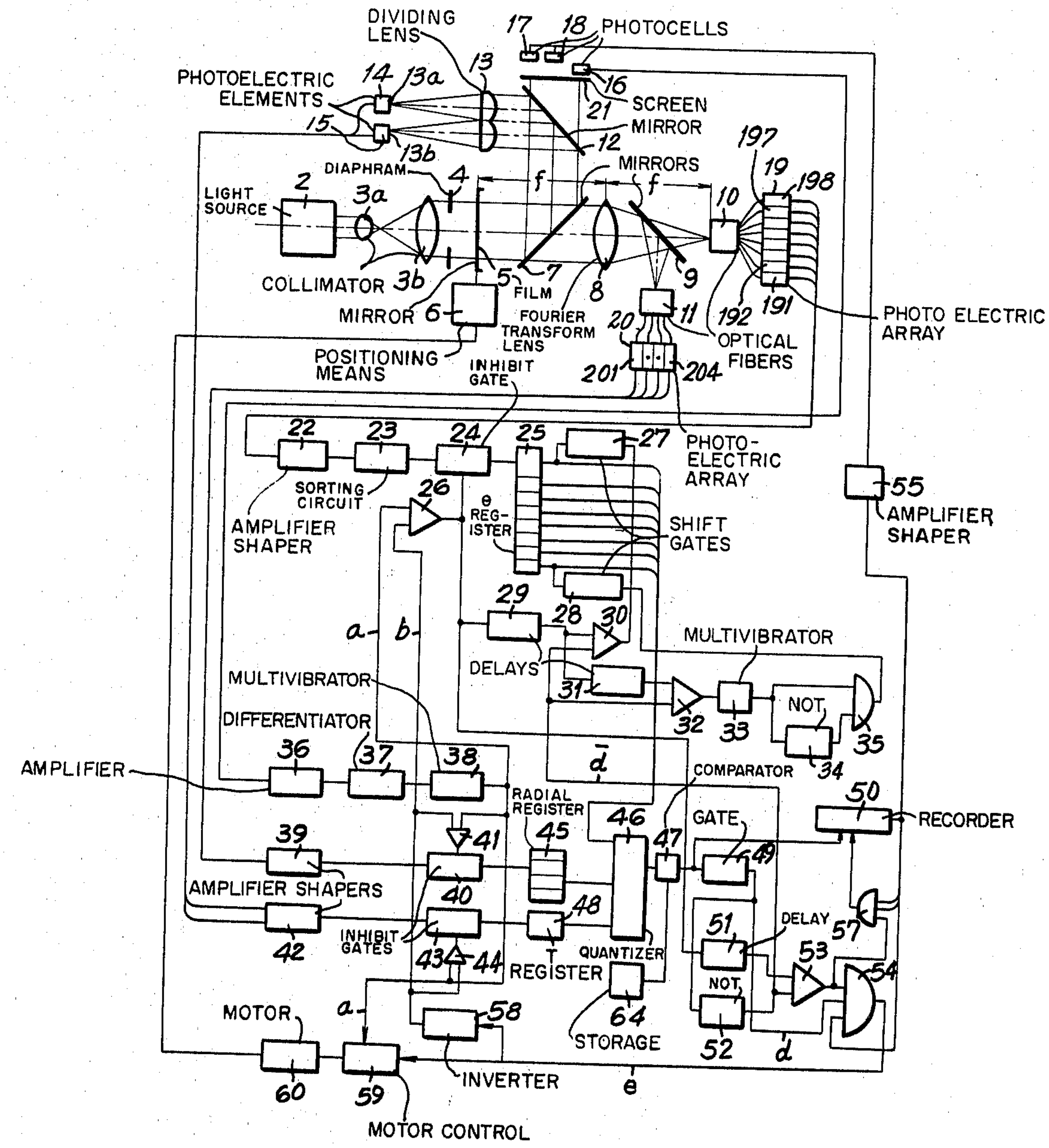
FIG. 1 is a diagrammatic illustration of a system according to the present invention.

Table 1 illustrates the manner in which linear distributions of an angular register are shifted in the event of encountering an input pattern which is angularly tilted; and Table 2 is a schematic illustration of the signals achieved with the invention.

DESCRIPTION OF PREFERRED EMBODIMENTS

As has been pointed out above, one of the objects of the present invention is to lower the cost of an electronic circuitry by assigning the two-dimensional information handling function to the optical system while reducing the logical handling function of the electronic circuitry. With the present invention the optical system is constructed in such a way that it is capable of photoelectrically detecting a Fourier transformation image of a two-dimensional pattern. In this way it is possible to provide an optical system of such simple structure and low cost that it consists primarily of an incoherent light source and a Fourier transformation lens.

In accordance with one of the features of the present invention, as a result of the characteristic of the Fourier transformation optical system described below, the alignment of the system is readily carried out and the shake resistance nature thereof is such that a holography type of optical system is not required.

According to conventional techniques, slit-scanning in the angular direction only of a Fourier transformation image is carried out in order to extract features of patterns. In accordance with the present invention, however, this scanning operation is carried out simultaneously in two directions. The Fourier transformation image is divided in two and photoelectric scanning is carried out in two directions of polar coordinates, namely the radial direction $r$ and the angular direction $\theta$, so that in this way the redundancy of the information is increased.

According to conventional light filtering techniques, a pattern correlative image is detected as a spot so that redundancy is decreased and discrimination between resembling patterns is hindered. In contrast, with the present invention there is an excellent solution to this latter problem.

Conventionally, the means for photoelectric scanning of Fourier images has been a mechanical structure in the form of a rotating slit disc to carry out angular scanning. For a practical pattern recognizing apparatus, however, with such a mechanical scanning system the input pattern reading speed is too low, reaching at the most 200 characters per second. For radial scanning it is necessary to carry out expansion and contraction of a circular or ring slit whose width is constant. This latter type of operation is necessary because Fourier image of a curve, especially of an arc type of pattern, is a ring distribution. It is extremely difficult to realize such a ring scanning system with a mechanical structure. Therefore, with the photoelectric detection structure according to the present invention no low-speed mechanical scanning is utilized. Instead a completely new system is utilized where optical filters serve as the elements for transforming the radial and angular components of the Fourier transformation image into linear distributions on a pair of mutually independent line segments. Thus, the angular and radial components of the image are transformed according to the present invention into linear image distributions in connection with rectangular coordinate axes ($x$, $y$) so as to carry out simultaneous photoelectric detection. This feature is one of the great advances achieved with the present invention.

As will be explained below, the characteristic function of a Fourier transformation is that the pattern image remains unchanged (except for phase) when the input pattern shifts in the $x$ and $y$ directions. Inasmuch as in practice there appears during pattern transportation an overlapped Fourier image of neighboring characters, in order to carry out rapid automatic reading of character patterns it is necessary to provide an automatic pattern transporting system. In this case also it is necessary that each pattern be stopped at the optical axis and correctly positioned. For this latter purpose the apparatus according to the invention is provided with an input pattern positioning means.

Among character patterns there are some whose Fourier images resemble each other very closely, such as for example the characters 6 and 9, *u* and *n*, *p* and *d*, and *b* and *q*. The problem of discriminating between such patterns is solved with the present invention in the following manner: The pencil of light rays which pass through each pattern is divided in two either longitudinally or transversely, and the pattern bit resulting from comparison of these two amounts of light with each other is added to the information in accordance with the angular and radial scanning of the pattern.

In this way it is possible to achieve with the present invention a pattern identifying system whose discrimination ratio is greater than that of a coherent light correlation system, by utilizing optical two-dimensional parallel information processing operations and by utilizing a combination of an optical system of a relatively simple structure with a relatively simple logic system.

The characteristic of the Fourier transformation image of the pattern is as follows: In practice input patterns are printed or typewritten letters. These letter patterns can be approximated as a combination of straight line segment component and arc component. First, the Fourier transformation image of a line segment is considered. The input line segment $f(x, y)$ is approximately regarded as a slit $\delta(mx - y + k)$, ($\delta$ indicates delta function, $m$ is the gradient of the straight line, $k$ is the position shift from the optical axis). The amplitude distribution after Fourier transformation is $\delta(u/m + v)$, ($u$, and $v$ are space frequencies at the Fourier transformation face), and the light intensity distribution I is: $I = \text{Sin}\ au/u$. Thus, the Fourier image of the line segment pattern is obtained in a state which is perpendicular thereto and invariably passes the origin irrespective of the position of the line segment. Owing to the linear characteristic of Fourier operator (F), the Fourier images of a plurality of mutually parallel line segments coincide with one another on the image plane.

The above matter will be more generally explained herebelow: Let the input pattern be $\alpha_i f_i(x,y)$ ($i$=1, 2, . . . , $n$; $\alpha_i$ : constant) and its Fourier image be $F_i(u, v)$. Then, the amplitude distribution at the image plane is given by:

$$F\left[\sum_i \alpha_i f_i\{a(x-p_i),\ b(y-q_i)\}\right] = \left|\frac{1}{ab}\right| \sum_i F_i\left(\frac{u}{a}, \frac{v}{b}\right) \exp\left[-j\ 2\pi(up_i+vq_i)\right];$$

and the light intensity distribution I is given by:

$$I=\left(\frac{1}{ab}\right)^2 \sum_m \sum_n F_m\left(\frac{u}{a}, \frac{v}{b}\right) F_n\left(\frac{u}{a}, \frac{v}{b}\right) \times \exp\left[-j\ 2\pi\{u(p_m-p_n)+v(q_m-q_n)\}\right]$$

The following is understood from the above obtained Fourier image intensity distribution I: (I) The Fourier images of the pattern elements are linearly added together; (II) Irrespective of the position shift ($p$, $q$) of each pattern, the Fourier image is produced at the optical axis center; However, (III) in connection with expansion and contraction of the input pattern [($ax$, $by$)], there is given a quite different, respectively contracted and expanded space frequency components [($u/a$, $v/b$)].

This characteristic applies also to the arc component of the input pattern. Owing to the above characteristic (II), irrespective of the position of the arc of the input pattern, its Fourier image gives ring-shaped light intensity distribution at the optical axis center. This is represented by $J_1(\rho)/\rho$ type ($J_1$ ($\rho$) is Bessel function of first order, $\rho^2 = u^2 + v^2$).

Figure 2A:
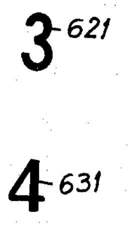
FIG. 2 (*a*) illustrates two examples of characters which are to be identified.
Figure 2B:
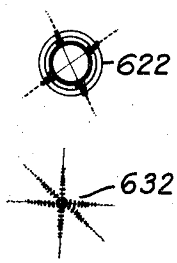
Figure 2C:
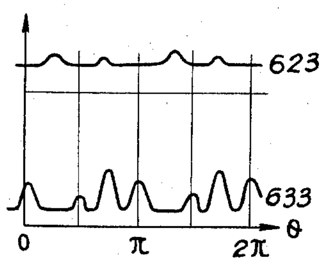

From the above it will be understood that the light intensity distribution of a Fourier image of an arbitrary input pattern is of two kinds, consisting of a line distribution which is perpendicular to the line segment element of the pattern and a ring distribution composed of the arc components of the pattern. Each of these is symmetrical with respect to the optical axis. Examples of input patterns and their Fourier images are illustrated in FIGS. 2 ($a$) and 2 ($b$), respectively.

Referring now to FIG. 1, there is illustrated therein an optical system and electronic circuitry according to one example of the present invention.

The light source 2 which forms part of the optical means of FIG. 1 may, for example, take the form of a laser. However, such a light source is not absolutely essential since the light source need not necessarily be coherent and it is possible, for example, to use a mercury lamp. A laser light source, however, is desirable because of its brightness, directivity, and coherent Fourier image characteristic. The light rays from the light source 2 travel along the optical axis illustrated by the dot-dash line extending horizontally through the light source 2 of the optical means illustrated. The light rays from the light source are converted into enlarged parallel light rays by a collimator 3$a$, 3$b$ of the optical means, and in this way the light is utilized to illuminate a film 5 which has thereon the pattern which is to be identified. The film 5 carries, for example, one page of negative type printed letters, symbols, patterns, etc. In order to pick up one pattern from such a page, a diaphragm 4 is situated immediately before the film 5. The film 5 is supported at the reading location illustrated in FIG. 1 by a positioning means which includes the structure 6 as well as the units 60 and 59 referred to in greater detail below. Thus at the reading location illustrated in FIG. 1, the pattern which is to be identified extends across the optical axis with some of the elements of the optical means being situated before the reading location while additional elements thereof are situated after the reading location considered in the direction of light travel from left to right, in FIG. 1. The light which passes through the film 5 is received by a partially transparent mirror 7 of the optical means. The mirror 7 reflects part of the light upwardly, as viewed in FIG. 1, toward a mirror 12 referred to in greater detail below. The major part of the light, however, passes through the mirror 7. As will be pointed out below, the light reflected by the mirror 7 is utilized for pattern positioning purposes and for quantizing the light.

The optical means includes subsequent to the mirror 7 in the direction of light travel a Fourier transformation lens 8, and the major part of the light which passes through the mirror 7 produces a Fourier transformation image of the input pattern at the focus of the lens 8. For this purpose it is necessary that the reading location of the input pattern be situated at the front focal plane of the lens 8 situated at the focal length $f$ in front of the lens 8, as shown in FIG. 1.

Figure 3A:
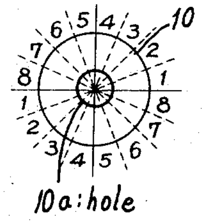
FIG. 3 (*a*) illustrates the structure of an optical fiber system used in connection with angular detection.
Figure 3B:
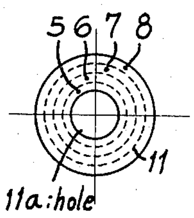

The Fourier transformation image is received by a semi-transparent mirror 9. Thus, the elements 7–9 form elements of the optical means which are situated at the right of the reading location where the pattern on the film 5 is located while the elements 2, 3$a$, and 3$b$, as well as the diaphragm 4 are situated along the optical axis in advance of the reading location. The optical means thus delivers the Fourier transformation image by way of the semi-transparent mirror 9 to a photosensitive means 10, 11 formed by the optical fiber units 10 and 11 which are respectively situated at the two foci of the Fourier transformation lens 8. The photosensitive means 10 forms an angular photosensitive unit including optical fibers used for angular component transformation of the Fourier image of input pattern. The optical fiber elements of the angular photosensitive unit 10 are arranged in the manner illustrated in FIG. 3($a$). Thus, the angular photosensitive unit 10 includes a series of angularly arranged optical fibers which respond to the presence or absence of an image at the location of the several fibers. This unit 10 is formed with a central opening or hole 10$a$ so as to block the zero order component of the Fourier image, thus eliminating the d.c. component of the Fourier image and thus improving the pattern discrimination ratio. The radius of the hole 10$a$ is determined in accordance with the focal length and aberration of the Fourier transformation lens 8 and the effective spectrum width of the light source. It is sufficient that the outer radius of the optical fiber unit covers up to the third or fourth order of the Fourier image frequency, and the radius can be computed as a function of the focal length of the lens, the wavelength of the light from the light source, and the largest width of the pattern. The high frequency components of the Fourier image vary as a result of such minute differences of the input pattern as broken letter configuration, ink blots in the printing, smudges, or minute differences in the forms of the letters. Therefore, in order to eliminate the influence of such minute differences, such high frequency components are not detected. The face of the optical fiber unit 10 is equally divided into eight parts as shown in FIG. 3(*a*) and the output end portions of these parts are arranged in a line in the order of the number of divisions so that photoelectric detection may be made with respect to these output end portions by means of elements 191, 192. . . 198 of a photoelectric array 19, shown in FIG. 1.

The photosensitive means further includes a radial photosensitive unit 11 which receives light reflected from the mirror 9 while the angular photosensitive unit 10 receives light which passes through the mirror 9. The radial photosensitive unit 11 is formed of optical fiber rings 5–8 illustrated in FIG. 3(*b*). Thus it will be seen from FIG. 3(*b*) that the radial photosensitive unit 11 is formed with a central opening or hole 11a and is circularly divided by the concentric optical fiber rings 5–8 in the manner illustrated. The light intensity at these rings is photoelectrically transformed in a mutually dependent manner by means of the elements 201–204 of the photoelectric array 20, illustrated in FIG. 1.

Thus, with the example of the invention which is illustrated in FIG. 1, the Fourier image is subjected to the action of the semi-transparent mirror 9 so as to produce light rays for the detection of the radial and angular components of the Fourier image. However, if the following optical fiber arrangement is employed, then the semi-transparent mirror 9 and 1 of the photosensitive units are not required. Utilizing an arrangement of optical fiber elements as shown in FIG. 3(*a*), there are randomly arranged half-number elements extracted from the range of $m\pi/8$ ($m = 1, 2, \ldots, 8$) are made the $m$-th of $\theta$-components (angular components), and the remaining elements extracted from the range $nR/4$(R is the radius of the fiber, $n = 1,2,3,4$) are made the $n$-th of the $r$-component (radial component). Then with such construction light reception may be made by respective photoelectric elements.

Figure 4:
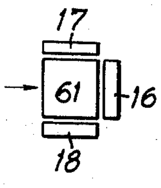
FIG. 4 is a schematic representation of the arrangement of photosensitive elements for detecting improperly positioned characters.

The light which has passed through the pattern at the reading location and is reflected by the mirror 7 is received by a second semi-transparent mirror 12. The light which passes through the mirror 12 is used for accurately positioning the pattern which is to be identified, while the light reflected by the mirror 12 is used for differentiating different parts of the image with respect to each other in order to provide additional identifying information. FIG. 4 illustrates the arrangement of the photocells 16–18. Thus, a transparent screen 21 is provided to receive the light passing through the mirror 12, and the three photoelectric elements 16–18 are arranged in a common plate in the manner illustrated in FIG. 4 where the largest width and height of the input pattern are represented by the rectangle 61. The input patterns are supplied in sequence in the direction of the arrow shown in FIG. 4. The photoelectric element 16 has a width corresponding to the spacing required by the letters and a height corresponding to the height of the letters with this element being arranged in such a way that it will become dark when an input letter or pattern is positioned at the center of the rectangle 61. On the other hand, each of the photoelectric elements 17 and 18 has a width corresponding to the spacing between the lines and a length corresponding to the width of the letter. Unless the position of the pattern to be identified has shifted in the direction of the photoelectric elements 16–18, these elements will not produce any signal. Thus, the elements 16–18 will provide the signals for controlling the positions of the letters or other patterns to be identified at the reading location, as will be apparent from the description which follows. The pattern image resulting from reflection at the semi-transparent mirror 12 is longitudinally or transversely divided into two parts by a dividing lens 13 which together with the photoelectric elements 14 and 15 forms a differentiating means for differentiating between the two parts of the image respectively passing through the portions of the lens 13. Thus, the light rays which have travelled through the pair of halves of the dividing lens 13 converge to the foci 13*a* and 13*b*, respectively, and these are respectively detected by the photoelectric elements 14 and 15 which are situated at the latter foci, respectively. This part of the optical system of the invention has the function of adding a bit information resulting from the differential in the amounts of light papssing through the patterns so as to enable an accurate discrimination between such patterns as 6 and 9, *p* and *d*, *b* and *q*, with the Fourier images of the latter types of patterns either being the same or resembling each other so closely that they are difficult to discriminate only from the angular and radial component detection by way of the units 10 and 11.

The structure of FIG. 1 thus far described and shown at the other part of FIG. 1 forms the optical section of the system, and this optical section is electrically connected with electronic circuitry for quantization and identification of the pattern with the photoelectric signals delivered from the above structure to the electronic circuitry as described below.

Figure 5:
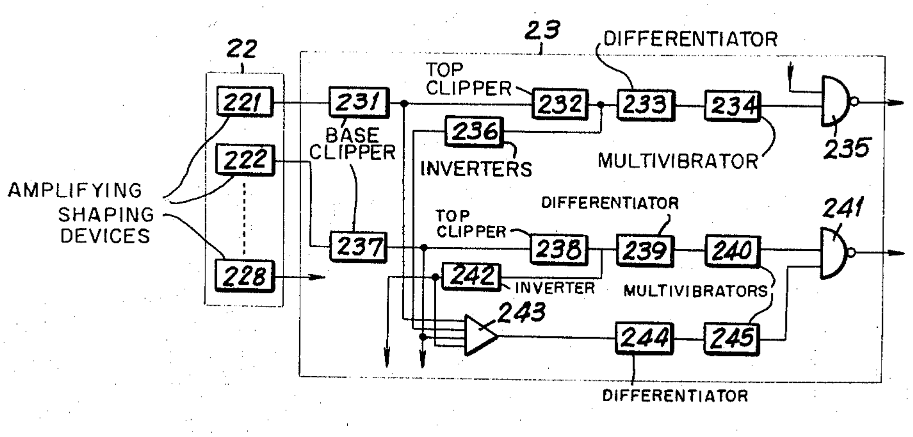
FIG. 5 is a schematic representation of a sorting circuit used in connection with patterns which have a relatively high degree of curvature.

The photosensitive means formed by the units 10 and 11 and the photoelectric arrays 19 and 20 respectively connected thereto is electrically connected with an electrical converting means which converts the detected angular and radial components into corresponding linear distributions. This electrical converting means includes an amplifying-shaping unit 22 which receives the output from the array 19 and amplifies and shapes the output of the array 19 to square wave pulses. The output of the amplifying-shaping unit 20 of the electrical converting means is received by a sorting circuit 23 which is described in detail below in connection with FIG. 5, and the output of the circuit 23 is then applied to an inhibit gate 24. In the event that an input signal is applied to the photoelectric element 16, which is to say when the pattern to be identified is moving and there is a shift in its position, producing the signal *a* of FIG. 1, and if at the same time the inverse signal of the input pattern transporting motor actuating signal *e* (the signal *b* of FIG. 1) is on, then the action of the product of *a* and *b* (and AND circuit 26) causes the gate 24 to be inhibited. A positioning completion signal releases the gate 24 and then the output of the amplifier 22 is memorized by a register 25.

The latter positioning signal is produced as follows: At the moment when the photoelectric element 16 detects a line spacing, the output of the amplifier 36 is differentiated by a differentiator 37, and the breaking signal of the differentiation wave (during light reception with respect to letters the output of the amplifier 36 is a positive voltage) triggers a multivibrator 38 and a positioning signal a is produced.

The angular component register or $\theta$-register 25 has the same number of places as the number of photoelectric elements in the array 19. In the illustrated example there are eight such elements, and the register memorizes simultaneously and in parallel the output pulse signals of the amplifier 22 which have passed through the inhibit gate 24. Of the outputs of the eight amplifying-shaping devices, the one with the $\theta$-component of the Fourier image is 1 (a pulse output is present) and one without this pulse output is 0. Thus, the $\theta$-register 25 records a binary pulse row.

The following circuitry is capable of compensating for the influence of rotation of the input pattern which is to be identified.

It is clear from the above-described characteristics of Fourier transformation that the influence of rotation of a letter or other pattern appears mainly as an influence on the angular components without any influence appearing at the radial components. In other words the influence of rotation is of significance only with respect to arc components of the pattern. The compensation for image rotation or tilting is of significance in two distinct ways. One is the case where the input letter or pattern is positioned correctly but as a result of its configuration the Fourier image extends over more than one of the eight dividing lines of the elements which form the optical fiber unit 10. In this case compensation is made by means of the sorting gate 23. The other situation is that where the input pattern or letter is inclined by a relatively great angle, and in this case compensation is made by way of the circuits 27–35 of FIG. 1.

In the former case, where the pattern is properly positioned but has a configuration extending over more than one of the eight optical fiber elements, the outputs of the amplifying-shaping devices 221, 222. . . 228 (FIG. 5) corresponding respectively to the elements of the photoelectric array 19 are applied to the sorting gate 23. The description which follows is only in connection with the action of compensating for rotation in connection with the first two amplifying-shaping devices 221 and 222, although it will be understood that the structure and function is the same for the remaining devices 223–228.

The sorting gate 23 includes base clippers 231 and 237 for eliminating the noise level of the output of the amplifying-shaping devices 221 and 222. Also the circuit includes top clippers 232 and 238 for producing as an output signals which are greater than the d.c. voltage level determined in accordance with the light amount level which is evidently considered to be applied as input to the photoelectric elements 191 and 192. The outputs of the top clippers 232 and 238 are applied as inputs to inversion circuits 236 and 242, respectively. Therefore, when the light intensity of the Fourier image is received by both of the photoelectric elements 191 and 192 across their border line, then the outputs of top-choppers 232 and 238 are 0 and outputs of the inversion circuits 236 and 242 are both 1.

These two outputs and the outputs of the base clippers 231 and 237 which are also 1 are simultaneously applied to an AND circuit 243. The output of the latter circuit is pulse-shaped by a differentiator 244 and a multivibrator 245 and is applied to an NOR circuit 241. Thus an ambiguous output extending over both of a pair of neighboring photoelectric elements results in the incorporation of both signals into a single signal from the upper part of the circuitry shown in FIG. 5, namely from gate 235. When no signal is detected on the photo detectors, the outputs of the top clippers 232 and 238 will be a 1 and will differentiators 233 and 239 and multivibrators 234 and 240, respectively, and are applied to the NOR circuits 235 and 241 and will not produce any output pulse. Only when the corresponding photo detectors detects a signal will the gate 235 and 241 produce an output pulse which is then transmitted to the inhibit gate 24.

The following operations take place in connection with the second of the above cases involving a letter or pattern which has been rotated or tilted with respect to its proper position. Reference is made to circuits 27–35 of FIG. 1 and Table 1 of the drawings. The circuit action in this case is the equivalent of making three pattern identifications in sequence (by rotating the contents of the register 25) with respect to three positions of the input letter or pattern consisting, respectively, of the normal position and positions resulting from angular rotations by angles of $\pm\pi/8$. It is assumed that indefiniteness in the identification resulting from very slight inclination of the letter or pattern and configuration of the letter or pattern is eliminated by the sorting circuit 23.

First, it is assumed that the Fourier image of the input pattern or letter is converted by the electrical converting means 23–25 into the linear distribution shown at line a Table 1. At the same time it is assumed that the information at the radial register unit 45, referred to below, and the t-register unit 48, which receives the information from the differentiating means 13–15, has been transmitted together with the information from the angular register 25 to the quantizing means 46, in the form of a judge matrix, to carry out an initial identifying operation which has resulted in the fact that an identification with respect to previously stored information in a storage means 46 cannot be made by a comparing means formed by the comparing circuit 47 and the identification completion gate 49, so that there is no output in the form of an identification completion signal *d*.

Thus, instead of an identification completion signal *d*, there is produced in this case an inverted *d*, as a result of the inversion achieved by the NOT circuit 52. The output of the AND circuit 26 is delayed by a delay unit 29 for an interval which is necessary for this latter judgement to be carried out. The delayed signal and the above-mentioned inverted identification signal d are applied as inputs to an AND circuit 30. The output of this AND circuit 30 gives a right-shift instruction to a right-shift gate 27 electrically connected with the angular register unit 25, so that the contents of the latter unit are shifted to the right by one place, with the result that the linear distribution shown at line a in Table 1 assumes the condition shown at line *b* in Table 1. With the linear distribution of the angular register unit thus shifted by one place, a second identifying operation is carried out with the process referred to above. If this action does not produce identification completion signal *d*, then the action of a delay device 31 and an AND circuit 32, a multivibrator 33, a NOT circuit 34, and an OR circuit 35 (these operations are the same as those of the above delay device and AND circuit 30) provides two sequential left shift pulses to a left shift gate 28. Accordingly, the linear distribution shown at line *b*, Table 1 is shifted two places to the left to assume the condition shown at line *c* in Table 1. Therefore, the linear distribution at line $b$ has been changed by first returning to the distribution at line a and then assuming the distribution shown at line $c$. Now a third identification process is carried out in the manner described above.

The above three identifying actions are completed when an identification completion signal $d$ is produced. In other words, at any one of the three stages if there is an identification completion signal then a proper identification has been made and the process stops. However, the shifting of the linear distribution first to the right by one place and then to the left by two places will take care of the situation where the pattern has been angularly tilted improperly.

Thus, with the above operations it is apparent that inclination of the input pattern or letter is permitted up to $\pm\pi/8$ (20.5°). With reference to another input letter or pattern whose angular or $\theta$-signal is entirely the same as that of the input pattern in question which has been rotated or tilted by $+\pi/8$ or $-\pi/8$, discrimination between these two patterns is clearly made by the radial signals or by a combination of the radial signals and the differentiating signals produced by the differentiating means 13–15, and therefore with this redundancy of information the discrimination ratio between mutually resembling patterns is extremely great.

Considering the radial unit 11 of the photoelectric means and the array of photoelectric elements 20 electrically connected therewith for detecting the radial components of the Fourier transformation image, the electrical signals produced thereby are converted by the electrical converting means so as to achieve a corresponding linear distribution at the radial register unit 45. For this purpose the signals from the array of photoelectric elements 201–204 are received by the amplifying-shaping device 39 and delivered to an inhibit gate 40 which is under the influence of an AND circuit 41 in the same way that the inhibit gate 24 is under the influence of the AND circuit 26, as described above. The signal is thus received by the radial register unit 45 in the form of four-bit binary codes.

The differentiating means 13–15 has its signal received by the differentially amplifying and pulse-shaping device 42 which also delivers its signal to an inhibit gate 43 controlled by an AND gate 44 which controls the inhibit gate 43 in the same way that the AND gate 26 controls inhibit gate 24, as described above. In this case if there is a meaningful difference between the two amounts of light travelling through the portions of the dividing lens 13, then a pulse signal 1 is produced, while if there is no such meaningful difference, there will be no such signal and instead the signal 0 will be produced. In this case the pulse signal 1 is produced when the amount of light passing through the upper half of the pattern is greater than that passing through the lower half of the pattern. This pulse signal of the light passes through the inhibit gate 43 and is memorized by a one-piece $t$-register unit 48.

The judge matrix circuit 46 which forms a quantizing means for receiving the linear distributions achieved by the electrical converting means is a conventional diode matrix circuit and the number of places of pattern quantization are eight for the angular distribution, four for the radial distribution, and one for the differential provided by way of the differential means 13–15, so that there are a total of thirteen places as illustrated in Table 2. If, for example, the group of patterns which are to be identified is made up of 26 letters of the alphabet, then the number of letters to be written is 26, and accordingly the matrix circuit is constituted by 13 rows times 26 columns.

The truth value table of the judge matrix circuit 46 consists, in the example illustrated in Table 2, of 13-place binary codes constituted by the contents of the angular component, radial component, and t registers arranged in a line. It is desirable from an economical point of view to select the smallest possible number of bits when, with respect to one input pattern group, in these thirteen bits in connection with every pattern there is invariably the place carrying 1 or 0, or discrimination among patterns can be carried out with the signals of less than 13 places. The output of the judge matrix is compared with the contents of a storage means formed by a write register 64 by way of a comparing means 47, 49, including the comparing circuit 47 and the identification completion gate 49, these units providing the completion instruction signal d as pointed out above.

A motor control circuit 59 forms part of the positioning means for positioning the pattern which is to be identified at the reading location, and this motor control circuit 59 receives a motor actuating signal e through the action of an OR gate 54. This OR gate 54 has three inputs. The first of these inputs is the identification completion signal $d$, which will simply cause the positioning means to be operated to position the next pattern at the reading location. The second input is applied in the case where identification is not successful after carrying out the three above-mentioned rotation compensating operations, and the logic product of the output d of a NOT circuit 52 with respect to the identification completion signal and the output of a delay circuit 51 corresponding to three computing durations is produced by an AND circuit 53, this output causing the motor actuating signal $e$ also to be produced. Further, in this latter second case, the output of the AND circuit 53 is applied to an OR gate 57 so as to be recorded at a recorder 50 in the form of a reject signal (a signal indicating that pattern recognition is impossible). If the identification completion signal d is produced, then the output of the comparataor 47, which is to say the identified pattern, is recorded at the recorder 50 in the form of bit signals.

The third input to the OR gate 54 is made by a shift of the input pattern or letter. The outputs of the photoelectric elements 17 and 18 are transformed into pulse signals through an amplifying-shaping unit 55 and are applied as inputs to OR gates 54 and 57 to produce a motor actuating signal $e$, and at the same time a reject signal is again recorded at the recorder 50.

On the other hand, the motor control circuit 59 receives an input in the form of a motor stopping instruction when the positioning signal a is provided in the manner described above. These signals or instructions for actuating and stopping the motor operate through the circuit 59 of the positioning means on a step motor 60 of the positioning means so that this step motor 60 will actuate the film transporting system 6 in order to transport the film 5 which carries the input pattern, this transportation being carried out intermittently so as to position the patterns or letters one after the other at the reading location.

FIG. 2($a$) illustrates numerals 3 and 4 as examples of input patterns 621 and 631. The Fourier transformation image of the pattern 621 is shown at 622 in FIG. 2(*b*), while the Fourier transformation 632 of the pattern 631 is also illustrated in FIG. 2(*b*). According to conventional rotating slit methods, these Fourier transformation images 622 and 632 will provide the scan signals 623 and 633 illustrated in FIG. 2(*c*). With such scanning methods where the zero-order light of diffraction is included, I) the d.c. bias of the scan signal varies with the pattern, and II) the $\theta$-signal of a letter having many arc components such as the numeral 3 is extremely weak.

Although it has not been described, there is another important means for increasing the discrimination ratio of pattern identification. This involves normalization of the input pattern image and arrangement for such normalization can be added to the structure according to the present invention. This normalization is made in the following manner: The photoelectric detection signal of the input pattern image is divided by the photoelectric detection signal of the passing-through light amount of the pattern at the stage of each amplifying-shaping device (a dividing circuit is added). The passing-through light amount of the pattern is obtained as the sum of the detection signals of the above photoelectric elements 14 and 15. In this manner it is possible to achieve normalized radial and angular signals which are independent of the image angle area of the input pattern.

As pointed out above, on the basis of optically two-dimensional parallel information processing functions, and by means of an optical system of extremely simple structure, the input pattern image is divided into polar coordinate components and is quantized, and the difference between amounts of light which pass through different portions of the pattern is added to the above-obtained information. In addition there is added a means for automatically compensating for the influence of rotation and position shift of the pattern, so that redundancy in quantization of the input pattern is increased, and it is possible to provide an automatic pattern identifying means which has a discrimination ratio that is greater than that of a coherent optical correlation method and which in addition is highly economical and compact.

The Fourier image detecting system of the invention utilizing optical fibers is highly advantageous in that the input pattern readout time is remarkably reduced.

What is claimed is:

1. In a system for identifying two-dimensional patterns, positioning means for positioning a pattern which is to be identified at a reading location, optical means for forming a Fourier transformation image of a pattern at said reading location, said optical means having an optical axis extending through said reading location and having elements distributed along said optical axis before and behind said reading location, photosensitive means positioned with respect to said optical axis for receiving said Fourier transformation image and for detecting angular and radial components thereof, electrical converting means electrically connected with said photosensitive means for receiving an input therefrom formed by said components and for converting said components respectively into corresponding binary representations which form an output of said electrical converting means, and correlating means electrically connected to said electrical converting means for receiving said binary output therefrom and for electronically correlating said output with reference binary representations to achieve therefrom a signal which identifies the pattern at said reading location, a differentiating means being optically connected with said optical means for differentiating between two parts of the pattern at said reading location prior to its formation into a Fourier transformation image, and electrical transmitting means electrically connected between said differentiating means and said correlating means for comparing the two parts and transmitting to the differentiating means an additional signal according to the difference between the light passing through two parts of the pattern at said reading location for providing at said correlating means an increased capacity for discriminating between different patterns.

2. In a system for identifying two-dimensional patterns, positioning means for positioning a pattern which is to be identified at a reading location, optical means for forming a Fourier transformation image of a pattern at said reading location, said optical means having an optical axis extending through said reading location and having elements distributed along said optical axis before and behind said reading location, photosensitive means positioned with respect to said optical axis for receiving said Fourier transformation image and for detecting angular and radial components thereof, electrical converting means electrically connected with said photosensitive means for receiving an input therefrom formed by said components and for converting said components respectively into corresponding linear distributions which form an output of said electrical converting means, and quantizing means electrically connected to said electrical converting means for receiving said output therefrom and for quantizing said output to achieve therefrom a signal which identifies the pattern at said reading location, said optical means including an image-transmitting means for transmitting the Fourier transformation image along a pair of distinct paths, said photosensitive means including an angular photosensitive unit situated along one of said paths for detecting angular components of the image transmitted along said one path and a radial photosensitive unit situated along the other of said paths for detecting radial components of the image transmitted along said other path, said angular photosensitive unit including a series of angularly arranged optical fibers for responding to the presence or absence of an image at the location of said fibers and a plurality of photocells respectively connected with said fibers for providing an array of signals according to the response of said fibers, said radial photosensitive unit including a plurality of concentric optical fiber rings for responding to the presence or absence of radial components of the Fourier transformation image and a plurality of photocells connected with said rings for providing an array of signals according to the response of said rings, said electrical converting means including an angular register unit electrically connected with said photocells of said angular photosensitive unit and having a number of places equal to the number of the latter photocells, said register places and said photocells all operating simultaneously and in parallel and further including a radial register unit electrically connected with said optical fiber rings and having a number of places equal to the number of rings for memorizing signals therefrom, said places of said radial register unit operating simultaneously and in parallel with said optical fiber rings and said angular and radial photosensitive units operating simultaneously so that evaluation of the entire Fourier transformation image takes place at all parts at the same time, said angular and radial register units both being electrically connected with said quantizing means for simultaneously transmitting signals thereto, and wherein a differentiating means is optically connected with said optical means for differentiating between predetermined parts of a pattern at said reading location, and signal-transmitting means electrically connected between said differentiating means and said quantizing means for transmitting to the latter an additional signal according to the difference between the parts of a pattern as detected by said differentiating means, said signal-transmitting means including a third register for receiving a signal from said differentiating means according to the difference, if any, between the parts of the pattern differentiated by said differentiating means, and said third register being electrically connected with said quantizing means for transmitting an additional signal to the latter which increases the discriminating capacity of said quantizing means.

* * * * *